United States Patent
Azevedo et al.

(10) Patent No.: US 9,981,755 B2
(45) Date of Patent: May 29, 2018

(54) AIRSHIP-MOORING DEVICE

(71) Applicant: ALTAVE INDÚSTRIA COMÉRCIO E EXPORTAÇÃO DE AERONAVES LTDA-ME, São José dos Campos, São Paulo (BR)

(72) Inventors: Bruno Avena de Azevedo, São Paulo (BR); Leonardo Mendes Nogueira, São Paulo (BR); Christian Lima Do Amaral, Paraná (BR)

(73) Assignee: ALTAVE INDÚSTRIA, COMÉRCIO E EXPORTAÇÃO DE AERONAVES LTDA-ME, Sao Paulo (BR)

( * ) Notice: Subject to any disclaimer, the term of this patent is extended or adjusted under 35 U.S.C. 154(b) by 2 days.

(21) Appl. No.: 14/762,140

(22) PCT Filed: Jan. 17, 2014

(86) PCT No.: PCT/BR2014/000009
§ 371 (c)(1),
(2) Date: Jul. 20, 2015

(87) PCT Pub. No.: WO2014/110639
PCT Pub. Date: Jul. 24, 2014

(65) Prior Publication Data
US 2015/0367959 A1 Dec. 24, 2015

(30) Foreign Application Priority Data
Jan. 18, 2013 (BR) .......................... 1020130013161

(51) Int. Cl.
*B64F 1/14* (2006.01)
*B66D 3/26* (2006.01)
(Continued)

(52) U.S. Cl.
CPC .................. *B64F 1/14* (2013.01); *B64B 1/66* (2013.01); *B66D 1/38* (2013.01); *B66D 3/26* (2013.01)

(58) Field of Classification Search
CPC ...... B64F 1/12; B64F 1/14; B64F 3/00; B64F 3/02; B64C 2201/148; F16M 11/08;
(Continued)

(56) References Cited

U.S. PATENT DOCUMENTS 345,268 A * 7/1886 Wright .................... B63B 21/00
114/230.23
989,534 A * 4/1911 MacDuffee ............ H02G 11/02
169/24

(Continued)

FOREIGN PATENT DOCUMENTS

| CN | 101898633 A | 12/2010 | |
|---|---|---|---|
| DE | 19808777 | 9/1999 | ............. B64C 27/20 |
| PT | 103489 | 11/2007 | ............... F03D 5/00 |

OTHER PUBLICATIONS

International Search Report issued in application PCT/BR2014/000009, dated Apr. 25, 2014 (4 pgs).

*Primary Examiner* — Joseph W Sanderson
(74) *Attorney, Agent, or Firm* — Neal Marcus

(57) ABSTRACT

A mooring device is disclosed for an airship. The mooring device comprises a lower module including a plurality of resting structures configured to sustain the mooring device to a substrate; and an upper module mounted to the lower module along a vertical axis of the upper module and configured to rotate with respect to the lower module, the upper module including: (1) a winch with a shaft configured to rotate; (2) a support structure supporting the winch; and (3) a cable passing member, the cable passing member having first and second arms mounted to the shaft and configured to pivot independently with respect to the shaft;

(Continued)

(4) a drum mounted to the shaft between the first and second arms and configured to rotate in response to the rotation of the shaft, thereby enabling a cable to be wound and unwound as the drum rotates.

18 Claims, 4 Drawing Sheets

(51) Int. Cl.
  *B66D 1/38* (2006.01)
  *B64B 1/66* (2006.01)
(58) Field of Classification Search
  CPC ..... F16M 11/2014; B63B 21/00; B63B 21/04; B63B 21/16; B63B 2021/003; B66D 1/28; B66D 3/26; B66D 2700/0183; H02G 11/02
  See application file for complete search history.

(56) References Cited

U.S. PATENT DOCUMENTS

| | | | | | |
|---|---|---|---|---|---|
| 1,413,948 | A | * | 4/1922 | Ullmann | B64F 1/14 244/115 |
| 1,622,140 | A | * | 3/1927 | Getchell | B64F 1/14 244/115 |
| 1,634,989 | A | * | 7/1927 | Fravel | B64F 1/14 244/115 |
| 1,770,675 | A | * | 7/1930 | Short | B64F 1/14 244/116 |
| 1,914,408 | A | * | 6/1933 | Douglas | B64F 1/14 244/116 |
| 1,949,888 | A | * | 3/1934 | Statham | B64F 1/14 244/115 |
| 3,108,940 | A | * | 10/1963 | Holdsworth | C23F 13/04 204/196.02 |
| 3,230,790 | A | * | 1/1966 | Luketa | B63B 21/16 74/469 |
| 3,524,606 | A | * | 8/1970 | Coski | B65H 75/4402 242/484 |
| 3,552,682 | A | * | 1/1971 | Walsh | B63B 21/58 242/397.3 |
| 3,848,892 | A | * | 11/1974 | Reder | B60P 3/1066 280/414.1 |
| 4,103,844 | A | * | 8/1978 | Deinert | B63B 21/16 242/372 |
| 4,148,465 | A | * | 4/1979 | Bowman | B66D 1/28 114/210 |
| 4,842,219 | A | | 6/1989 | Jakubowski et al. | 244/31 |
| 6,241,063 | B1 | * | 6/2001 | Van Ess | H02G 11/02 191/12.2 A |
| 6,276,503 | B1 | * | 8/2001 | Laughlin, Jr. | B65H 75/403 191/12.2 A |
| 6,877,881 | B2 | * | 4/2005 | Tsao | F21V 21/06 362/220 |
| 7,093,824 | B2 | * | 8/2006 | Pulliam | A01K 3/00 256/35 |
| 7,309,060 | B2 | * | 12/2007 | Baughman | B65H 75/305 254/134.3 R |
| 7,322,308 | B2 | * | 1/2008 | De Baan | B63B 21/50 114/230.1 |
| 7,931,133 | B2 | * | 4/2011 | Vannest | B65H 75/4463 191/12.2 R |
| 7,984,798 | B1 | * | 7/2011 | Hall | H02G 11/02 191/12 R |
| 8,240,266 | B2 | * | 8/2012 | Cole | E02B 3/20 114/230.2 |
| 8,247,912 | B2 | | 8/2012 | Da Costa Duarte Pardal et al. | 290/44 |
| 9,243,965 | B2 | * | 1/2016 | Williams | G01L 5/103 |
| 2006/0207487 | A1 | * | 9/2006 | De Baan | B63B 21/50 114/230.1 |
| 2007/0114503 | A1 | * | 5/2007 | Baughman | B65H 75/305 254/134.5 |
| 2007/0119997 | A1 | * | 5/2007 | Boon | B65H 75/425 242/159 |
| 2009/0020060 | A1 | * | 1/2009 | Burnette | B63B 27/24 114/230.1 |
| 2009/0184196 | A1 | | 7/2009 | Price | 244/33 |
| 2010/0218670 | A1 | * | 9/2010 | Keng | F41A 23/14 89/37.04 |
| 2011/0198177 | A1 | * | 8/2011 | Hall | H02G 11/02 191/12.4 |
| 2011/0291061 | A1 | * | 12/2011 | Costas | B66D 1/28 254/332 |
| 2012/0112008 | A1 | | 5/2012 | Holifield et al. | 244/155 |
| 2012/0181380 | A1 | * | 7/2012 | Van Staagen | B64B 1/50 244/33 |
| 2012/0181381 | A1 | | 7/2012 | Vercesi et al. | 244/96 |
| 2012/0290226 | A1 | * | 11/2012 | Williams | G01L 5/103 702/41 |
| 2013/0076217 | A1 | * | 3/2013 | Thompson | B65H 75/14 312/309 |
| 2015/0158600 | A1 | * | 6/2015 | Hachtmann | B64F 3/00 244/110 E |
| 2016/0347594 | A1 | * | 12/2016 | Shmueli | B66D 1/741 |

\* cited by examiner

US 9,981,755 B2

AIRSHIP-MOORING DEVICE

FIELD OF THE INVENTION

The present invention relates to lighter-than-air aircraft, and more specifically to mooring systems for airships.

BACKGROUND OF THE INVENTION

Airships are lighter than air aircraft whose lifting is mainly due to static impulse of air.

Basically there are two types of airships: balloons, which are not self-propelled that can be displaced due to external impulsion the air currents, and captive balloons that do not move freely, being permanently fastened to the ground. Airships (dirigibles) are vehicles with self-propulsion that are usually performed by motor drivers.

In the case of captive balloons, the mooring device for these airships is of great importance, since it enables the captive balloons to efficiently perform their duties, as well as retrieve the airship as needed.

In general, mooring systems have a winch, a safety cable and a safety cable control system that aims to make it impossible for this to contact improper parts of the winch, which would cause cable abrasion. The safety cable control system is also responsible for maintaining the radius of curvature of the cable within acceptable limits, and avoiding excessively sharp bends that may cause wear and break of internal elements such as fiber optic.

The existing winches in the state of the art are generally made for automotive or nautical applications. In these applications, the position of the vehicle being towed or "winched" is known. The vehicle is behind the tug and the cable output direction varies within a narrow range of angles.

In the case of airships, the cable output direction varies substantially in a large opening cone. That is, the airship can be in any direction, since its stabilization is passive. That is, it will always be oriented in the wind direction and course. There is also a ratio between horizontal displacement versus height (called blow-by) that also depends on the magnitude of the wind, the cable section diameter, atmospheric turbulence and net thrust (thrust generated by the gas minus deadweight, minus weight of the payload). That is, the winch operating condition is completely different from the usual uses, whether it is automotive, nautical or for cargo lift.

The problem is exacerbated when using electro-mechanical (MS) or electro-optical-mechanical (EOM) cables, which require an elevated minimum curvature radius to preserve the life of the cable, avoiding the rupture of its core.

The patent literature describes both airships and their mooring systems. The document CN 101898633 discloses a mooring device in a trailer for small and medium-sized airships, provided with a mooring tower. A semitrailer, a turning platform fixed on the semi-trailer by means of a swivel bracket, and a mooring tower positioned in front of a turning platform are disclosed. A plurality of horizontal support arms positioned on the rear of the platform and a box of capsules are also arranged at the rear of the turning platform. Although useful, this mooring device has a large size and serves to store the empty airship.

The U.S. Pat. No. 4,842,219 anticipates a fastening system for luminous signs during launch, which has a mooring device. The mooring device is provided with one degree of freedom that allows it to turn around the vertical axis, and a tilt up and down, to try to control safety cable tension avoiding his break. This mooring device, however, is not able to turn vertically.

The patent PT103489 anticipates a control system for releasing and retrieving the safety cable of an airship capable of converting the wind in wind energy.

The US patent application US20120181381 deals with a mooring device for an airship, which allows maintaining a minimum curvature radius of the cable, and which is provided with a rigid structure that serves for the safety cable routing. However, since the structure is rigid, which means that the cable exerts a considerable normal force over this structure, the structure is made of metal. The friction of the cable in the structure must be considerably large, which is disadvantageous, and also creates structural requirements relevant to the cable guide structure.

The prior art therefore anticipates different ways of controlling the stress and routing of airships safety cables.

SUMMARY OF THE INVENTION

The present invention relates to a mooring device for airships that is able to turn around its vertical and horizontal axes, allowing the safety cable to wind with little or no friction. This device has the advantage of having a small size that favors its portability.

BRIEF DESCRIPTION OF DRAWINGS

In order to achieve a full and complete view of the mooring device for airships, which now is the concern of the invention described herein, there are drawings to which references are made as follows.

DETAILED DESCRIPTION OF THE INVENTION

Figure 1:
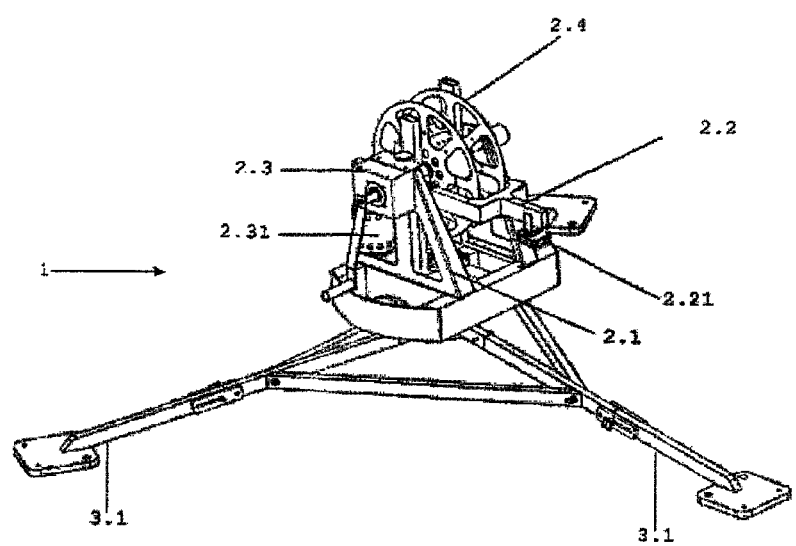
FIG. 1—is a perspective view of one of the embodiments of the mooring device.

The mooring device (1) for airships of the present invention is portable, and comprises of an upper module (2) and a lower module (3).

The upper module (2) comprises a support structure (2.1); a cable passing member (2.2) provided with two mobile arms; a winch (2.3) connected to the support structure; a drum (2.4) attached to the winch motor for winding the safety cable (2.5); and a turning base (2.12) also connected to the support structure.

The support structure (2.1) connects the upper module (2) to the lower module (3); it has a tubular structure in the shape of a hollow pyramid made of metallic material, and has fitting points that enable the fitting of the other components to this structure.

The cable passing member (2.2) has a guide tip (2.21) and parallel arms (2.22). The guide tip (2.21) is provided with a driving opening (2.23) that departs the winch from the cable arrival point, allowing it to be properly wound and avoiding that there is an unwanted moment in the structure.

In order to favor the safety cable (2.5) sliding through the guide tip (2.21), the guide tip (2.21) is made of a material having low coefficient of friction. Preferably, the coefficient of friction of the material used on the edge guide (2.21) is lower than 0.5. More preferably the coefficient of friction is lower than 0.05. Preferably, the material used in the guide tip (2.21) is a material such as, for example, polytetrafluoroethylene (PTFE) sold under the trademarks Teflon®, Syncolon®, Fluon®; the perfluoroalkoxyde (PFA) sold under the trademarks Teflon® PFA, Neoflon® PFA, and Hyflon® PFA; and the mixture of ethylene-chlorotrifluoroethylene (ECTFE) sold under the trademarks Halar® and TURSite®.

The guide tip (2.21) can be fastened in a stable and/or mobile form at the tip of the parallel arms (2.22). Preferably, the guide tip (2.21) is movably fastened, and can make oscillatory movements in relation to its transverse axis.

The parallel arms (2.22) are jointed at its their front ends forming a single bar, and connect the cable passing member (2.2) on the support structure (2.1). They have freedom of movement in relation to the horizontal axis of the mooring device (1) by mounting the parallel arms (2.22) in a same shaft (2.33) as the winch (2.3).

As the distance "d" between the guide tip (2.21) and the drum (2.4) is related to the distribution easiness of winding the safety cable (2.5) on the drum (2.4), it is advisable that this distance be the highest possible value, without, however, compromise compromising the portability of the system. Thus, "d" preferably ranges between 0.3 m and 2 m.

The freedom of vertical movement allows the safety cable (2.5) alignment with the drum (2.4), preventing the cable from excessively bending and forming an unwanted angle, and favoring the safety cable (2.5) winding on the drum (2.4).

The winch (2.3) is provided with a motor (2.31), a reduction box (2.32), and a shaft (2.33) that together allow rotation of the drum (2.4) in both directions of rotation. The winch is mounted to support structure (2.1) and positioned with respect to upper shaft (3.2) of the lower module (3) for operation as shown. Also, there are included a disengage system to uncouple the winch drum and enable a free rotation or coupling and the use of a hand crank with or without gearing for relieving of force. Also present is a brake system operated by a pawl and ratchet mechanism or the like to stop the free rotation of the drum under these conditions.

In order to transmit electrical energy and/or data to the airship, a rotary joint is positioned on the shaft (2.33). Since the energy is transmitted by the safety cable, which can be an EM cable, a fiber optic and/or an EOM cable (2.5), the rotary joint can be selected from a group consisting of a "slip ring", a sliding electrical contact or a rotary joint for fiber optic—FORJ with or without an integrated electrical contact.

The drum (2.4) is fixed to the shaft (2.33) and produced in metal, and has a gap (2.41) free of ripples in which the safety cable (2.5) wraps itself. The gap (2.41) has a width "h" directly proportional to the distance between the guide tip (2.21) and the drum (2.4). The drum further includes a spring switch that is responsible for the deactivation of the engine, if the cable unwinds more than is recommended, that is, if the last layer of cable has filled less than half the gap. Alternatively, a mechanical terminal can be used made in order to create a loop at the end of the cable.

The turning base (2.12) is fastened to the support structure (2.1) and allows the mooring device (1) to rotate in relation to its vertical axis.

Figure 5:
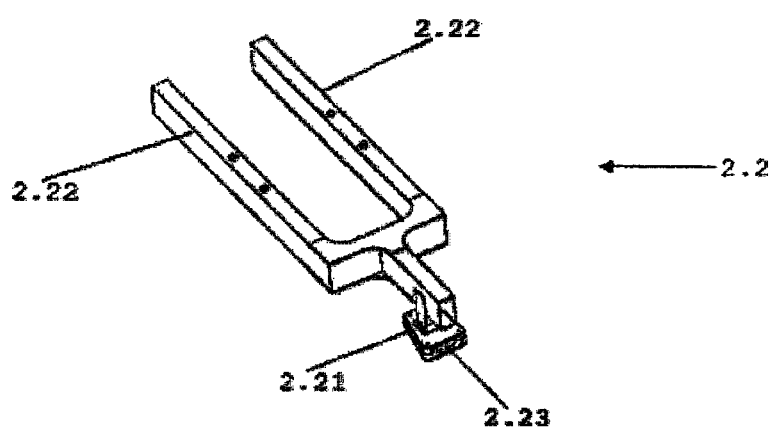
FIG. 5—shows a perspective view of the cable passing member.
Figure 6:
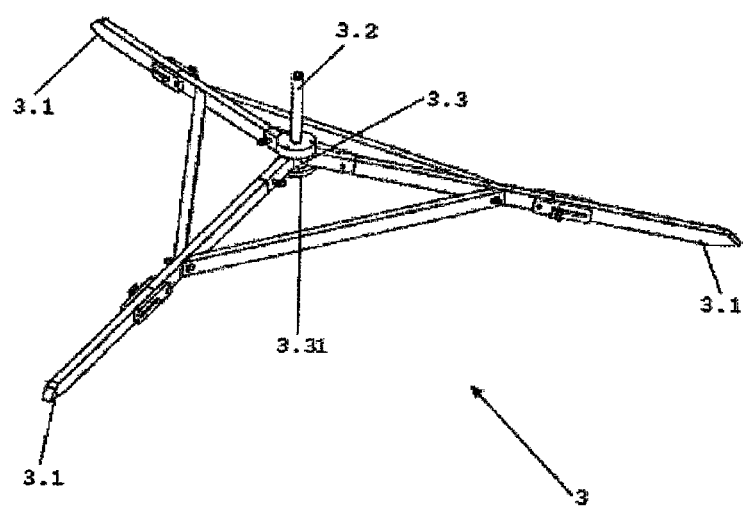
FIG. 6—a perspective view of the lower module embodiments.

Due to the degree of freedom in the vertical axis of the upper module, a normal force exerted by the cable on the guide tip is low. Further, as with small deflections of the cable to tip the guide system quickly responds to moving itself to accompany the cable, the contact area is small. That is, the central angle of the arc described by the cable inside the guide tip is small, allowing for having a small part. This, together with the low coefficient of friction of the material used in the guide tip (2.21), which makes frictional loads on the guide tip (2.21) low, enables the present invention to change the traditional pulley system belonging to the state of the art winches for a curved and fixed surface, as can be seen in FIG. 5).

Figure 2:
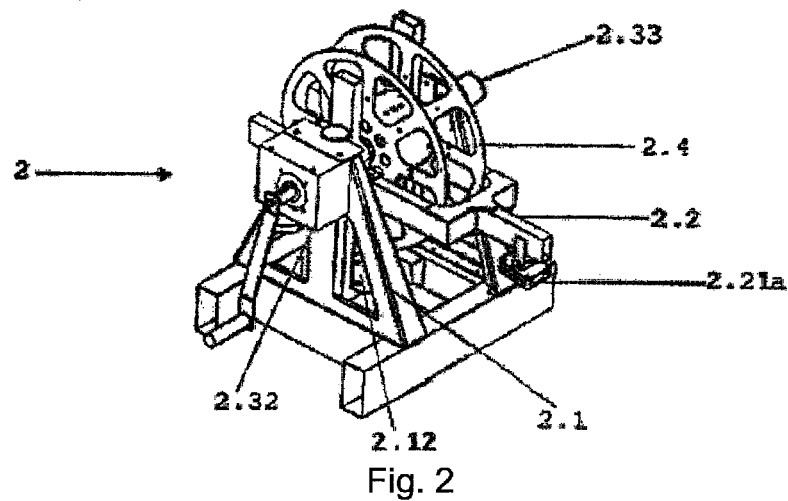
FIG. 2—shows an expanded partial view of the upper module components of the mooring device in FIG. 1.
Figure 3:
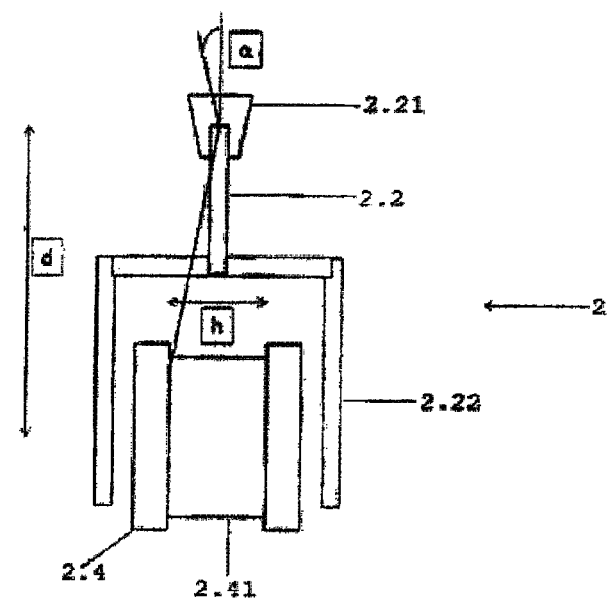
FIG. 3—schematic view of the upper module indicating the angle α.
Figure 4:
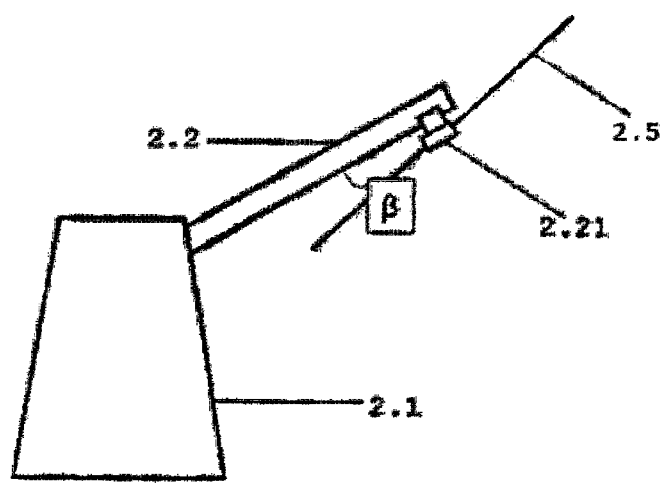
FIG. 4—shows a partial schematic view of the upper module components indicating the angle β.

As can be seen in FIG. 2), the guide tip (2.21) also has a driving opening (2.23) whose central point is represented by the point "O". Due to the degrees of freedom of movement of the mooring device for airships, the present invention, in relation to its vertical and horizontal axes, there is a formation of an angle α between the safety cable (2.5) and the point "O". α is calculated using the formula below:

$$\alpha = a\sin(x/d)$$

In critical cases, i.e., with a greater inclination of the arms with respect to the cable output, x is equal to half the width "h", thus the greater the distance "d" and the smaller the width "h", the safety cable (2.5) will be more easily positioned by the mooring device (1) of this invention.

The lower module (3) consists of the resting structures (3.1) that provide the sustaining of the mooring device (1) to the substrate, an upper shaft (3.2) and a lower shaft (3.3).

Preferably, the resting structures (3.1) belong to the group consisting of a set of shoes, feet, pins, removable and foldable legs, fixed and foldable legs, bushings, screws and nuts.

The type of resting structures (3.1) varies according to the substrate such as the ground, an automotive vehicle, and a vessel.

In an embodiment of the present invention, the mooring device (1) is fixed directly on the ground, and in this case the resting structure (3.1) comprises between 2 and 5 removable and foldable legs that attach the vertical axis, enabling the connection of the lower module (3) with the upper module (2). In this embodiment, on the lower end of between 2 and 5 removable and foldable legs dimensions, shoes are positioned in the same through-holes provided with stakes for use in earth, sand or any type of easy handling ground. The holes are coated with a material of high hardness, to the guidance of a tool. In this case, between 2 and 5 removable and foldable legs can be directly bolted to the high-hardness substrate, such as concrete, asphalt and high resistance soils. The used tool can be a drill, with the subsequent use of mechanical or chemical ragbolt, or a fixing gun.

In the upper shaft (3.2) between the lower shaft (3.3) and the upper module (2), a rotary joint is positioned (3.31) for the transmission of electricity and/or data to the upper module. This energy serves both to operate the winch motor and to feed the EM or EOM cable. In the case of data, the data are transmitted to an EOM cable in order to establish a communication with the payload onboard the airship. This rotary joint can be selected from a group consisting of a "slip ring", a sliding electrical contact or a rotary joint for fiber optic—FORJ with or without an integrated electrical contact.

The high hardness material may be steel, hardened steel or a polymeric material of high hardness.

While the invention has been described extensively herein, various changes and modifications of the invention may be made by those skilled in the art after reading this disclosure and that the scope of the invention is to be determined by the claims below.

The invention claimed is:

1. A mooring device for an airship, the mooring device comprising:
   a lower module including a plurality of resting structures configured to sustain the mooring device to a substrate; and
   an upper module mounted to the lower module and configured to rotate with respect to the lower module, the upper module including:
   (1) a winch with a shaft configured to rotate;
   (2) a support structure supporting the winch; and
   (3) a cable passing member, the cable passing member having first and second arms mounted to the shaft and configured to pivot independently with respect to the shaft;
   (4) a drum mounted to the shaft between the first and second arms and configured to rotate in response to the rotation of the shaft, thereby enabling a cable to be wound or unwound as the drum rotates.

2. The device according to claim 1, wherein the upper module further comprises:
   a turning base connected to the support structure.

3. The device according to claim 2, wherein the support structure is configured to connect the upper module to the lower module via the turning base, wherein the support structure is tubular, and has a shape of a hollow pyramid.

4. The device according to claim 1, wherein the cable passing member includes a guide tip, wherein the guide tip is made of a material with a coefficient of friction lower than 0.5 and is provided with a driving opening maintained at a distance 'd' between the drum and the guide tip.

5. The device according to claim 4, wherein the guide tip is made of a material with a coefficient of friction lower than 0.05.

6. The device according to claim 4, wherein the guide tip is movably fastened on a tip of the first and second arms, and the guide tip is adapted to make oscillatory movements in relation to a transverse axis of the guide tip.

7. The device according to claim 4, wherein the distance "d" between the guide tip and the drum is between 0.3 m and 2 m.

8. The device according to claim 4, wherein the drum includes a gap having a narrow width "h", so that a ratio d/h of the distance between the guide tip and drum, d, and a width of the gap, h, varies between 2 and 20.

9. The device according to claim 1, wherein the winch further includes a motor and a reduction box that together along with the shaft enable the drum to rotate in either direction.

10. The device according to claim 1, wherein the lower module includes a rotary joint positioned on the shaft to transmit power or data to the airship; the rotary joint being a joint selected from the group consisting of a slip ring, a sliding electrical contact, and a fiber optic slip joint with or without an integrated electrical contact.

11. The device according to claim 1, wherein the drum is fixed to the shaft and produced of metal, and said drum has a gap free of ripples in which the cable is wound.

12. The device according to claim 1, wherein the device includes a turning base fastened to the support structure, and the turning base allows the upper module to rotate in relation to a vertical axis of the upper module.

13. The device according to claim 1, wherein the plurality of resting structures each comprise a plurality of legs and a mechanism that enables each leg to be removable and foldable.

14. The device according to claim 1, wherein the lower module includes an upper shaft with a rotary joint in the upper shaft for transmitting electrical power and data to the upper module; and the rotary joint is selected from the group consisting of a slip ring, a sliding electrical contact and a fiber optic slip joint with or without an integrated electrical contact.

15. The device according to claim 14, wherein the rotary joint is positioned on the shaft of the winch and on an upper shaft of the lower module.

16. The device according to claim 1, wherein the upper module is configured to move along horizontal and vertical axes thereof.

17. The device according to claim 1 wherein the cable passing member further includes a guide tip configured to enable the cable to slide through the guide tip.

18. The device according to claim 1 wherein the first and second arms are parallel and connected at a front end thereof by a bar.

* * * * *